United States Patent
Pedersen

(10) Patent No.: US 10,227,112 B2
(45) Date of Patent: Mar. 12, 2019

(54) ONBOARD SYSTEM FOR STACKING AND RETRIEVING CRAB POTS, AND RELATED METHODS

(71) Applicant: Eric Pedersen, Seattle, WA (US)

(72) Inventor: Eric Pedersen, Seattle, WA (US)

( * ) Notice: Subject to any disclaimer, the term of this patent is extended or adjusted under 35 U.S.C. 154(b) by 0 days.

(21) Appl. No.: 14/894,256

(22) PCT Filed: Apr. 20, 2015

(86) PCT No.: PCT/US2015/026684
§ 371 (c)(1),
(2) Date: Nov. 25, 2015

(87) PCT Pub. No.: WO2015/161316
PCT Pub. Date: Oct. 22, 2015

(65) Prior Publication Data
US 2016/0114864 A1   Apr. 28, 2016

Related U.S. Application Data

(60) Provisional application No. 61/981,644, filed on Apr. 18, 2014.

(51) Int. Cl.
*B66C 1/42* (2006.01)
*B65D 90/00* (2006.01)
(Continued)

(52) U.S. Cl.
CPC .............. *B63B 27/10* (2013.01); *A01K 69/00* (2013.01); *A01K 69/08* (2013.01); *B63B 35/14* (2013.01)

(58) Field of Classification Search
CPC .... B63B 27/10; A01K 69/08; B65D 90/0013; B66C 23/206
(Continued)

(56) References Cited

U.S. PATENT DOCUMENTS 2,803,084 A * 8/1957 Frerking ................ A01K 63/00
220/6
2,965,244 A * 12/1960 Schat ....................... B63B 23/20
212/248

(Continued)

*Primary Examiner* — Gregory W Adams
(74) *Attorney, Agent, or Firm* — Janeway Patent Law PLLC

(57) ABSTRACT

A system stacking and retrieving a crab pot onboard a vessel includes a crane having an end and operable to position the end at a plurality of locations on or near a vessel's deck, and an end effector at the end of the crane, operable to hold a crab pot. The crane is used to grab a crab pot stored on the deck and position the pot on a pot launcher, or to grab a pot on the pot launcher and position the pot on the vessel's deck to secure the pot onboard. The system also includes a connector operable to couple a crab pot with another crab pot, and a controller operable to direct the movement of the crane to position the end of the crane at a plurality of locations on or near a vessel's deck. With the system's controller the crane may be automatically controlled and directed without requiring a deckhand to manually direct the crane to the correct position on the vessel's deck. And, with the connector each crab pot may be secured to an adjacent crab pot during storage of the pots without the need of a deckhand. Thus, the system makes a once very dangerous job for deckhands on a crabbing vessel much safer.

14 Claims, 6 Drawing Sheets

(51) Int. Cl.
  *B63B 27/10* (2006.01)
  *B63B 35/14* (2006.01)
  *A01K 69/00* (2006.01)
  *A01K 69/08* (2006.01)

(58) Field of Classification Search
  USPC ......... 114/255, 373; 206/512, 598; 212/307, 212/309, 311; 220/23.2, 6; 37/315; 410/81; 414/137.7, 137.9, 138.5, 138.7, 414/142.6, 142.7, 142.8, 143.2; 43/100, 43/102, 55, 6.5, 8
  See application file for complete search history.

(56) References Cited

U.S. PATENT DOCUMENTS

| | | | | |
|---|---|---|---|---|
| 3,083,670 | A * | 4/1963 | Harlander | B60P 7/13 114/201 R |
| 3,180,622 | A * | 4/1965 | Fillion | A01K 73/06 212/258 |
| 3,184,881 | A | 5/1965 | Jatzeck | |
| 3,373,523 | A | 3/1968 | Olafson | |
| 3,465,901 | A | 9/1969 | Grabowski | |
| 3,556,456 | A * | 1/1971 | Lunde | B65D 90/0006 206/512 |
| 3,559,817 | A * | 2/1971 | Brown | B66C 13/18 212/231 |
| 3,715,831 | A * | 2/1973 | Mason | A01K 74/00 43/4.5 |
| 3,718,218 | A * | 2/1973 | Shields | B65D 90/0006 206/504 |
| 3,722,714 | A * | 3/1973 | Morris | B65D 88/022 206/499 |
| 3,894,493 | A * | 7/1975 | Strecker | B65D 90/0013 24/287 |
| 3,973,684 | A * | 8/1976 | Di Martino | B65D 90/0006 206/512 |
| 4,075,779 | A * | 2/1978 | Olafson | A01K 69/08 43/100 |
| 4,195,436 | A * | 4/1980 | Moure | A01K 69/08 43/100 |
| 4,498,584 | A * | 2/1985 | Newbury | A01K 63/02 206/504 |
| 4,831,773 | A | 5/1989 | Rostrom | |
| 4,854,800 | A * | 8/1989 | Frick | B63B 27/10 414/137.9 |
| 4,993,125 | A * | 2/1991 | Capron | B65D 90/0006 24/287 |
| 5,908,122 | A * | 6/1999 | Robinett | B66C 13/063 212/225 |
| 6,826,452 | B1 | 11/2004 | Holland et al. | |
| 6,832,580 | B2 * | 12/2004 | Marchioro | A01K 1/0245 119/452 |
| 7,056,081 | B2 * | 6/2006 | Kelly | B65D 88/022 220/1.5 |
| 7,861,458 | B2 | 1/2011 | Apps et al. | |
| 2009/0251253 | A1 | 10/2009 | Fullerton et al. | |
| 2010/0320265 | A1 * | 12/2010 | Hay | B65D 90/002 235/375 |
| 2011/0243698 | A1 * | 10/2011 | Herold | B66C 19/002 414/562 |
| 2012/0085756 | A1 * | 4/2012 | Beitler | B65D 88/128 220/1.5 |
| 2012/0251286 | A1 * | 10/2012 | Van Der Velden | B63B 27/10 414/732 |
| 2013/0231777 | A1 * | 9/2013 | Salamanca | B25J 11/00 700/245 |

\* cited by examiner

ONBOARD SYSTEM FOR STACKING AND RETRIEVING CRAB POTS, AND RELATED METHODS

CROSS REFERENCE TO RELATED APPLICATION AND CLAIM OF PRIORITY

This application claims priority from commonly owned U.S. Provisional Patent Application 61/981,644 filed 18 Apr. 2014, and titled "Automated System for onboard Commercial Crab Pot Stacking", and incorporated by reference.

BACKGROUND

Commercial crab fishing is labor intensive and dangerous work carried out in some the most extreme environments possible. For many years commercial fishing has topped the Bureau of Labor Statistics' list of jobs with the most fatalities—and crabbing in Alaskan waters is by far the most lethal form of fishing. The coast of Alaska and the Aleutian Islands often endure temperatures that are well below freezing and seas that are very rough. These conditions combined with the heavy equipment used to commercially fish for crab compound the dangers that commercial fishermen encounter when crabbing. Unlike the crab pots used by weekend pleasure boaters, a large commercial crab pot is generally 7 feet by 8 feet and weighs about 800-pounds empty.

A typical crab fishing expedition launches off the coast of Alaska and travels to a desired crabbing ground. At the desired ground each of the extremely large, heavy pots are hoisted by a crane onto a pot launcher where a deckhand baits the pot. After the pot is baited, the pot launcher then tilts the pot over the ship's gunnel to allow the pot to drop into the ocean. The crane is operated by a deckhand who maneuvers the end of the crane close to the pot to be hoisted. Another deckhand then attaches the desired pot to the crane by hand with a rope or hook. Often this deckhand must climb other pots to be able to do this. When the deck of the vessel is pitching from stormy seas and/or the pots are covered in ice, climbing the pots and fastening one of them to the crane can be very dangerous.

Similarly, storing each of the pots on deck after fishing for crab, exposes deckhands to very dangerous conditions. In addition to reversing the loading process discussed in the previous paragraph, the deckhand secures the recently positioned pot to other pots already positioned (stacked) on the deck for storage. The pots are often stacked four or five high and to secure the pot to the stack the deckhand typically ties the pot to the adjacent pot in a couple locations. Doing this while the deck is pitching in sub-zero temperatures and the crane is positioning the next pot for storage further exposes the deckhand to a very dangerous condition.

SUMMARY

In an aspect of the invention, a system for stacking and retrieving a crab pot onboard a vessel includes a crane having an end and operable to position the end at a plurality of locations on or near a vessel's deck, and an end effector at the end of the crane, operable to hold a crab pot. The crane is used to grab a crab pot stored on the deck and position the pot on a pot launcher, or to grab a pot on the pot launcher and position the pot on the vessel's deck to secure the pot onboard. The system also includes a connector operable to couple a crab pot with another crab pot, and a controller operable to direct the movement of the crane to position the end of the crane at a plurality of locations on or near a vessel's deck.

With the system's controller the crane may be automatically controlled and directed without requiring a deckhand to continually monitor the progress of the crane's movement and manually direct, as required, the crane to the correct position on the vessel's deck. And, with the connector each crab pot may be secured to an adjacent crab pot during storage of the pots without the need of a deckhand. Thus, the system makes a once very dangerous job for deckhands on a crabbing vessel much safer.

In another aspect of the invention, a method for stacking and retrieving a crab pot onboard a vessel includes positioning an end effector of a system's crane adjacent a crab pot, securing the crab pot to the end effector, moving the end effector of the crane toward a location on the vessel, and directing, with a controller of the system, the movement of the end effector.

Figure 4:
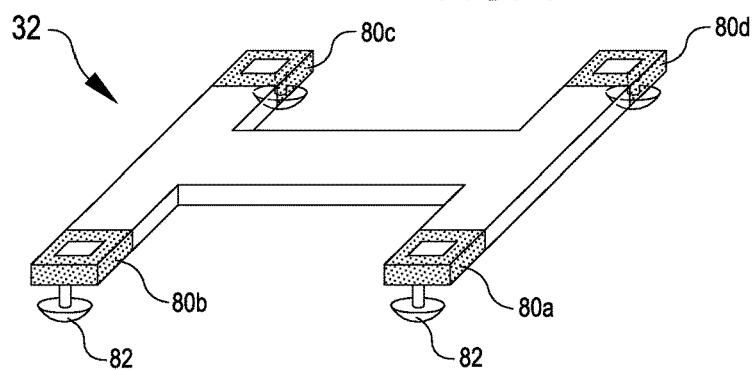
FIG. 4 shows a perspective view of an end effector included in the system shown in FIG. 1, according to an embodiment of the invention.
Figure 5A:
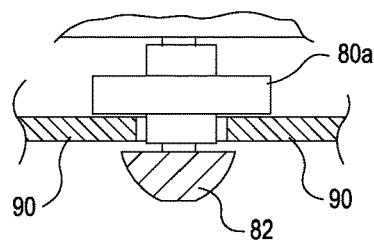
Figure 5B:
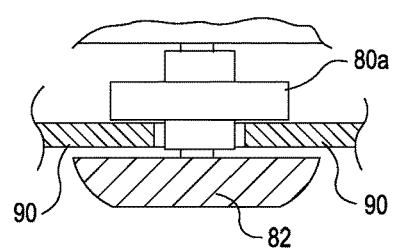

Each of the FIGS. 5A and 5B shows a view of a twist lock included in the end effector shown in FIG. 4, according to another embodiment of the invention.

Figure 6:
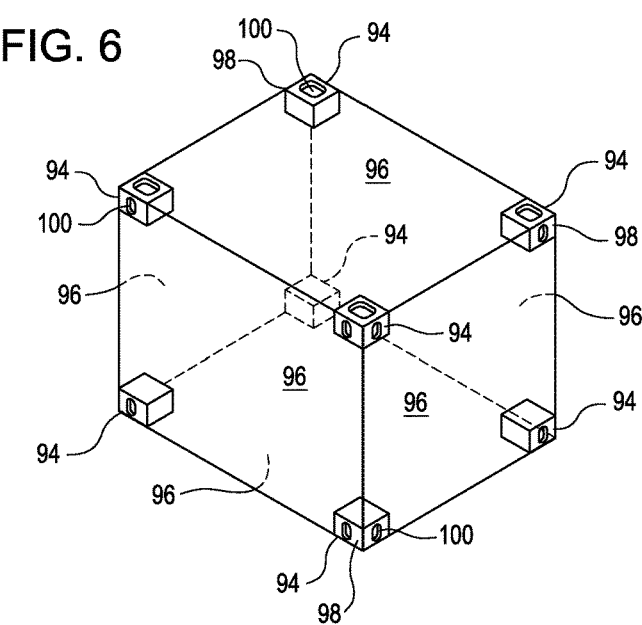

FIG. 6 shows a crab pot that includes a receiver, according to an embodiment of the invention.

Figure 1:
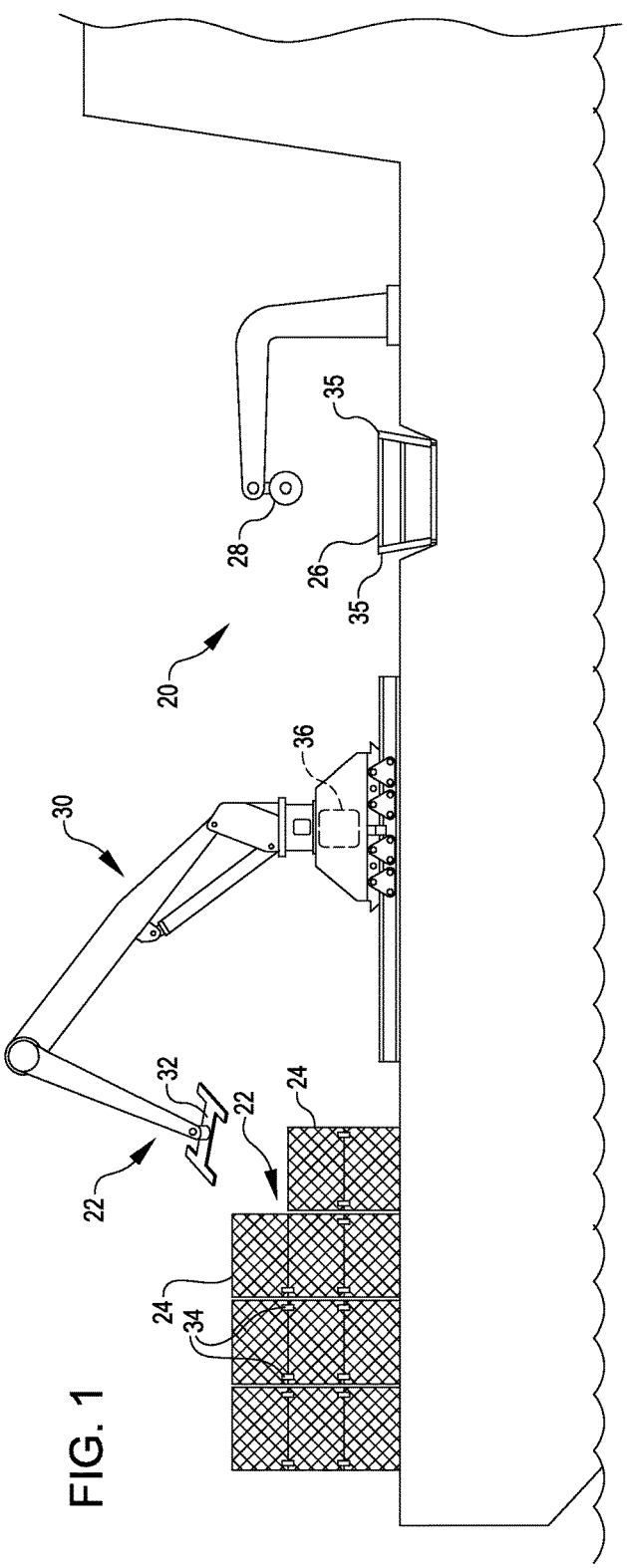
FIG. 1 shows a view of a crabbing vessel that includes a system for stacking and retrieving a crab pot onboard the vessel, according to an embodiment of the invention.
Figure 7:
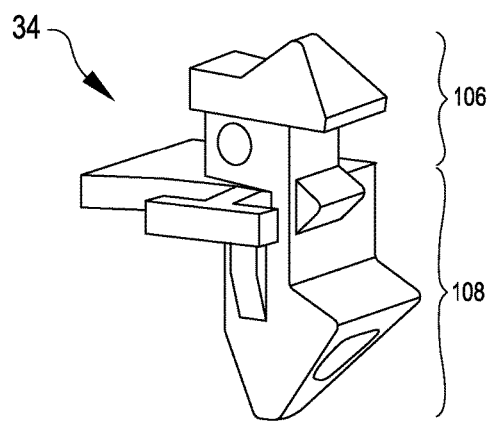

FIG. 7 shows a connector of the system shown in FIG. 1, according to an embodiment of the invention.

Each of the FIGS. 8A-8F shows a step in the process for coupling two crab pots together with the connector shown in FIG. 7, according to an embodiment of the invention.

DETAILED DESCRIPTION

FIG. 1 shows a view of a crabbing vessel 20 that includes a system 22 for stacking and retrieving a crab pot 24 (eleven shown but only two labeled for clarity) onboard the vessel 20, according to an embodiment of the invention. In addition to the system 22, the vessel 20 also includes a pot launcher 26 to launch a crab pot 24 over the vessel's gunnel and into the sea or to hold a crab pot 24 while crabs are removed from it, and a pot hauler 28 to haul a crab pot 24 out of the sea and onto the pot launcher 26 for unloading. The system 22 includes a crane 30 (discussed in greater detail in conjunction with FIGS. 2 and 3) to grab a crab pot 24 stored on the deck and position the pot 24 on the pot launcher 26. When the crab pot 24 is to be stored back on the deck of the vessel 20 for transportation to another crabbing location or back to port, the crane 30 grabs the pot 24 on the pot launcher 26 and positions the pot 24 on the vessel's deck to secure the pot 24 onboard. The system 22 also includes an end effector 32 (discussed in greater detail in conjunction with FIGS. 4, 5A and 5B) to hold a crab pot 24 to the crane 30 while the crane positions the pot 24 on the pot launcher 26 or on the vessel's deck. The system 22 also includes a connector 34 (fourteen shown but only two labeled for clarity) to couple a crab pot 24 with another crab pot 24. The connector 34 is discussed in greater detail in conjunction with FIGS. 7-8F. The system 22 also includes a component 35 that couples the connector 34 with a crab pot 24 when the pot 24 is to be positioned onboard for transportation to another location, and uncouples the connector 34 from the pot 24 before the pot launcher 26 drops the pot 24 into the sea. The system 22 also includes a controller 36 (discussed in greater detail in conjunction with FIG. 2) to direct the movement of the crane 30 and the end effector 32, to position a pot 24 held by the end effector 32 at a plurality of locations onboard the vessel 20.

With the system's controller 36 the crane may be automatically controlled and directed without requiring a deckhand to continually monitor the progress of the crane's movement and manually direct, as required, the crane to the correct position on the vessel's deck. And, with the connector 34 each crab pot 24 may be secured to an adjacent crab pot 24 without a deckhand required to manually tie the pots 24 together. Thus, the system 22 eliminates the need for a deckhand to climb on the pots 24 in heavy seas and sub-zero temperatures to release a pot 24 from another pot 24 to get the pot 24 ready for crabbing, or to secure a pot 24 to another pot 24 to transport the pots 24 to another crabbing location or to port. By eliminating these very dangerous jobs aboard a crabbing vessel, the system 22 reduces the chances of a deckhand getting in a serious accident, which could kill him/her.

Other embodiments of the system 22 are possible. For example, the system 22 may include two or more cranes 30 on the vessel's deck. Also, the controller 36 may be located at any other desired location on the vessel 20, such as the pilot house.

Figure 2:
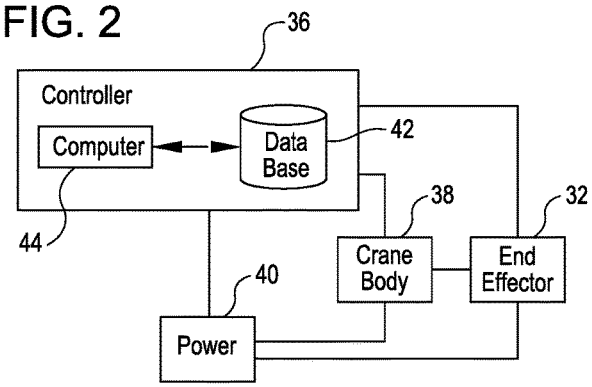
FIG. 2 shows a schematic view of a portion of the system shown in FIG. 1, according to an embodiment of the invention.

FIG. 2 shows a schematic view of the crane 30, according to an embodiment of the invention. The crane 30 includes a body 38 coupled to the end effector 32, and a power source 40 coupled to the controller 36, the body 38 and the end effector 32. The body 38 (discussed in greater detail in conjunction with FIG. 4) positions and supports the end effector 32 at the plurality of locations onboard the vessel 20. The power source moves and holds the crane's body 38 and end effector 21 toward and at any of the plurality of locations onboard the vessel 20.

The power source 40 may be any desired source of power capable of moving the crane's body 38, the end effector 32 and a crab pot 24 (FIG. 1), and when desired, holding these in a desired position and at a desired location. For example, in this and other embodiments the power source includes hydraulic motors and hydraulic lines and hydraulic pistons. Hydraulic power or power provided by oil flowing under high pressure is often desired to reduce the risk of fire and/or shock that can't be avoided with electrical motors and/or gasoline powered motors. In other embodiments, the power source may include pneumatic motors and pneumatic lines. In still other embodiments, the power source may include electric motors and wiring, and/or gasoline powered motors.

The controller 36 may be any desired controller capable of directing the movement of the crane's body 38 and the end effector 32 to position the end effector 32 at a plurality of locations onboard the vessel 20. For example, in this and other embodiments the controller 36 performs computational functions and receives information from one or more sensors (not shown) that help the controller 36 locate, grab and position a crab pot 24. More specifically, the controller 36 includes a database 42 of information pertaining to positions and locations on board the vessel 20 where one might want to position and locate a crab pot 24 (FIG. 1). The controller 36 also includes electronic circuitry (not shown) having a processor (also not shown) that can execute instructions included in a software program that when executed by the processor causes the controller 36 to identify the current location of a crab pot 24, the desired new location for the crab pot 24, and the location and position of the end effector 32 that will grab the pot 24 and move it to the new location.

In this and other embodiments, the controller 36 includes a conventional personal computer 44 whose operating system software can be any desired system software such as Windows 7, OS X (Mac), or Linux, that can support the hardware and software used by the controller 36. The electronic circuitry includes conventional circuitry and related hardware for receiving input from a sensor, and in response, executing instructions to locate, grab and position a crab pot 24. The information contained in the database 42 may include a map of the vessel's deck that may be generated by metric mapping, topological mapping, or vision mapping.

The controller 36 may also include a manual override to allow a deckhand to manually control the crane 30 and end effector 32. In manual override, the crane 30 may be directed to position the end effector 32 at a desired position onboard the vessel 20 using a graphic user interface (GUI) or text based commands in which an X-Y-Z position may be specified by a deckhand. In other embodiments, the crane 30 and end effector 32 may be directed by a handheld control and programming unit. With this, one may manually inch or jog the crane 30 along to position the end effector 32.

Figure 3:
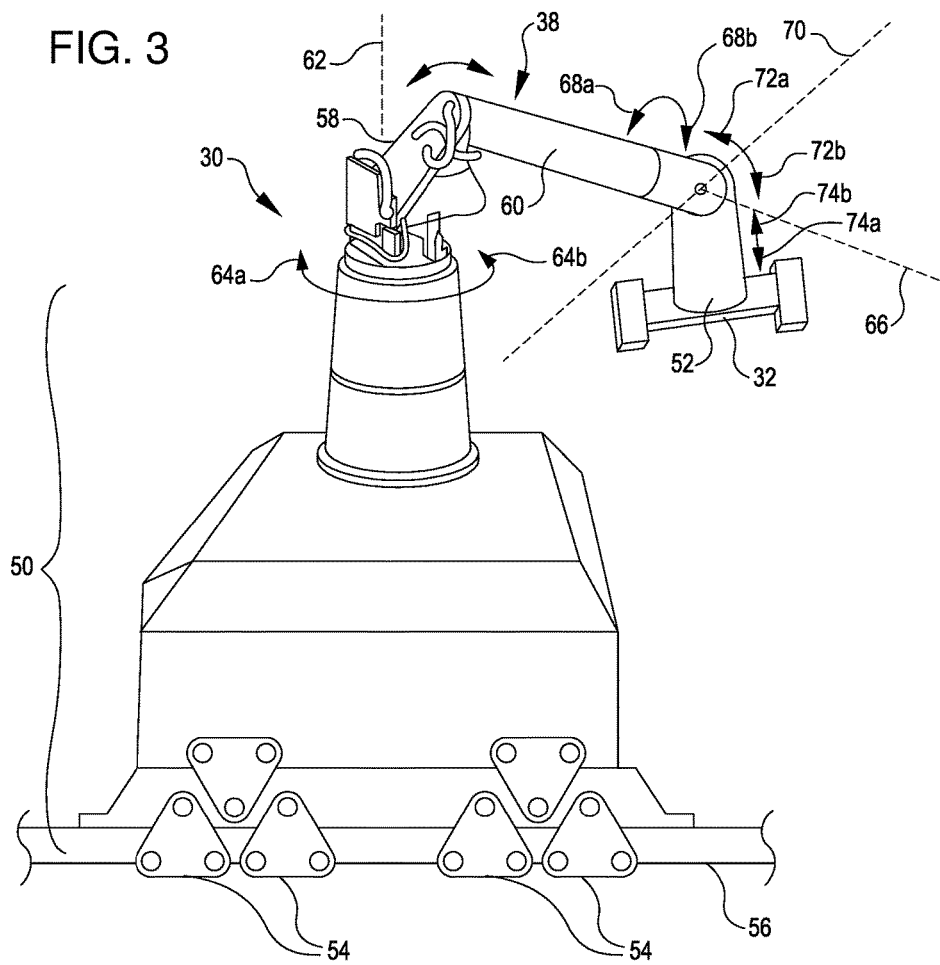
FIG. 3 shows a perspective view of a crane included in the system shown in FIG. 1, according to an embodiment of the invention.

FIG. 3 shows a perspective view of the crane 30 shown in FIG. 1, according to an embodiment of the invention. In this and other embodiments, the crane 30 is moveable relative to the deck of the vessel 20 (FIG. 1) when the crane 30 is mounted to the deck. This allows the crane 30 to position the end effector 32 and crab pot 24 at locations on the vessel's deck that would otherwise be beyond the reach of the crane 30. In other words, the crane 30 can include a short body 38 to make it more stable in rough seas and still reach many locations onboard the vessel 20.

The crane 30 may be configured as desired. For example, in this and other embodiments the crane 30 includes a base 50, a body 38, and an end 52. The base 50 includes wheels 54 mounted to a rail 56 such that the wheels 54, and thus the whole crane 30, can travel along the rail 56. By mounting the crane 30 to the rail 56, the crane 30 may be securely mounted to the vessel 20 and more likely to remain mounted to the vessel 20 in rough seas. The body 38 includes a first portion 58 pivotally joined to the base 50, and a second portion 60 pivotally joined to the first portion 58. The first portion 58 may also rotate relative to the base 50 about the axis 62 in the directions indicated by the arrows 64a and 64b. The end 52 is connected to the second portion 60 such that the end effector 32 may rotate about the axis 66 in the directions indicated by the arrows 68a and 68b, and about the axis 70 in the directions indicated by the arrows 72a and 72b. The end 52 is also connected to the second portion 60 such that the end effector 32 may extend away from the end 52 in the direction indicated by the arrow 74a, and toward the end 52 in the direction indicated by the arrow 74b. In addition, the end 52 may be locked in any position relative to the axes 66 and 70 to lock the end effector relative to the end 52.

Other embodiments are possible. For example, the base 50 may include wheels or a continuous track or caterpillar track like those used by tanks and tractors, and the wheels or tracks may not be mounted to a rail or otherwise mounted to the vessel's deck. In addition, the crane's base 50 may not move relative to the vessel's deck, but rather may be fixed to the deck 30. For another example, the body 38 of the crane 30 may include a single portion or more than two portions. In addition, the crane 30 may include more than one body 38 to allow the crane to position two or pots 24 at the same time.

FIG. 4 shows a perspective view of an end effector 32 shown in FIG. 1, according to an embodiment of the invention. The end effector 32 holds a crab pot 24 to the crane 30 while the crane 30 positions the pot 24 on the pot launcher 26 or on the vessel's deck.

The end effector 32 may be configured as desired. For example, in this and other embodiments the end effector 32 includes four coupling regions 80*a*-80*d*, and a twist lock 82 located at each of the regions 80*a*-80*d* to secure a crab pot 24 to the end effector 32. In other embodiments, the end effector 32 may include less than four or more than four coupling regions with corresponding twist locks 82. The twist locks 82 may be controlled by the system's controller 36 to twist as shown in FIGS. 5A and 5B relative to its corresponding coupling region 80*a*-80*d* when the twist lock 82 is inserted into a receiver (discussed in greater detail in conjunction with FIG. 6) of the crab pot 24. In other embodiments, the twist locks 82 may be triggered to twist to the locked position by contact with the receiver after they have been inserted into the receiver.

Other embodiments are possible. For example, the end effector 32 may include one or more connectors like that shown and discussed in conjunction with FIGS. 7-8F, in lieu of one or more of the twist locks 82. For another example, the end effector 32 may include one or powerful magnets to secure a crab pot 24 to the end effector 32.

Still referring to FIG. 4, the end effector 32 may be mounted to the end 52 of the crane 30 in any desired manner. For example, in this and other embodiments the end effector 32 is releasably mounted to the end 52 so that an end effector with a different number of coupling regions 80*a*-80*s*, or with a mechanism different than the twist locks 82, may be used to secure the crab pot 24 to the end 52 of the crane 30.

Each of the FIGS. 5A and 5B shows a view of the twist lock 82, according to another embodiment of the invention. FIG. 5A shows the twist lock 82 in the receiver 90 before twisting to the lock position, and FIG. 5B shows the twist lock 82 in the receiver 90 after twisting to the lock position.

FIG. 6 shows a crab pot 24 that includes a receiver 94 (here eight), according to an embodiment of the invention. When the crane 30 (FIG. 1) grabs the crab pot 24, at least one of the four twist locks 82 (FIGS. 4-5B) couples with a respective one of four receivers 94 of a face 96 of the pot 24. And, when the crab pot 24 is coupled to another crab pot 24 (shown in FIG. 1), a connector 34 (FIG. 1) couples with each of a respective one of the pot's receivers 94.

The receiver 94 may be sized and configured as desired. For example, in this and other embodiments the receiver 94 has six sides 98 that surround an inside cavity and form a rectangular shape. Three of the sides 98 that face away from the pot 24 include a hole 100 that opens the cavity to the outside environment. The hole 100 is sized and configured to allow the twist lock 82 to be inserted into the cavity when the twist lock is in the open position (see FIG. 5A), and to prevent the twist lock 82 from leaving the cavity when the twist lock 82 is in the locked position (see FIG. 5B). With the location of a hole 100 in the three sides 98 of the receiver 94 that face away from the pot 24, the pot may be coupled to another pot or grabbed by the crane 30 at any one of the six faces 96 of the pot 24.

FIG. 7 shows a connector 34 of the system 22 shown in FIG. 1, according to an embodiment of the invention. The connector 34 couples a crab pot 24 with another crab pot 24, and may also couple a crab pot 24 to the end effector 32. And with the component 35 (FIG. 1) coupling the connector 34 with a crab pot 24 when the pot 24 is to be positioned onboard for transportation to another location, or removing the connector 34 from the pot 24 before the pot launcher 26 (FIG. 1) drops the pot 24 into the sea, a deckhand does not have to couple the connector 34 with a pot 24. And thus, a deckhand may avoid climbing on the pots 24 in heavy seas and sub-zero temperatures to avoid getting into a serious accident.

The connector 34 may be sized and configured as desired. For example, in this and other embodiments the connector 34 includes a first portion 106 to hold a first crab pot 24, and a second portion 108 to hold a second crab pot 24. The connector 34 does not include any component that moves relative to another component of the connector 34, such as spring that might extend or compress relative to a body of the connector, or a latch that might pivot relative to a body of the connector to lock the connector to a receiver 94. In addition, the connector 34 is configured such that the second portion 108 may hold the second pot 24 while the first portion holds the first pot 24.

Each of the FIGS. 8A-8F shows a step in the process for coupling the first portion 106 of the connector 34 to the first crab pot 24 (FIG. 1), and coupling the second portion 108 to the second crab pot 24 (FIG. 1) to couple the two pots 24 together, according to an embodiment of the invention.

Figure 8A:
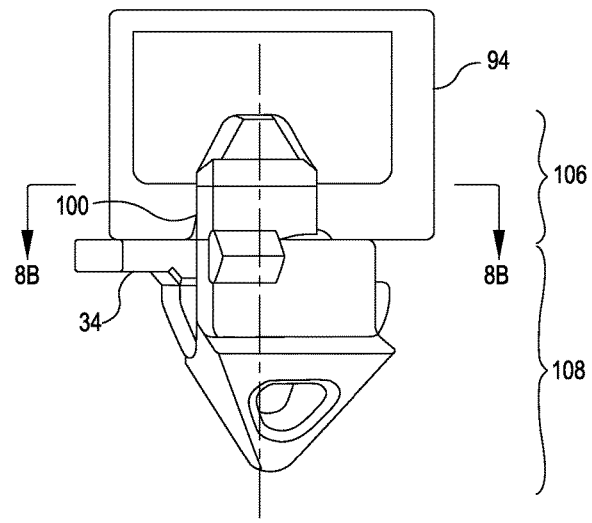
Figure 8B:
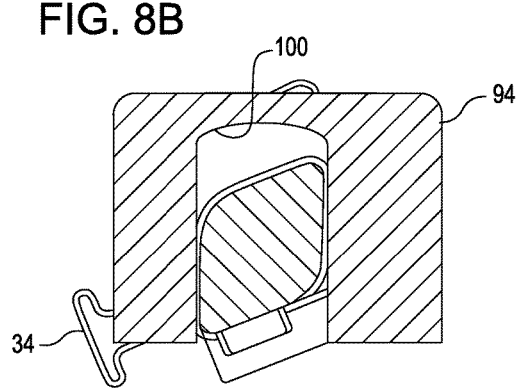
Figure 8C:
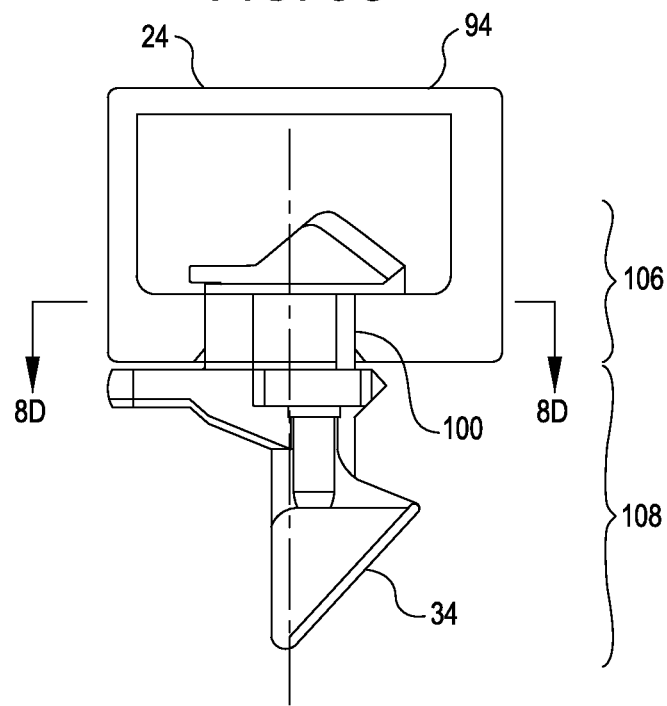
Figure 8D:
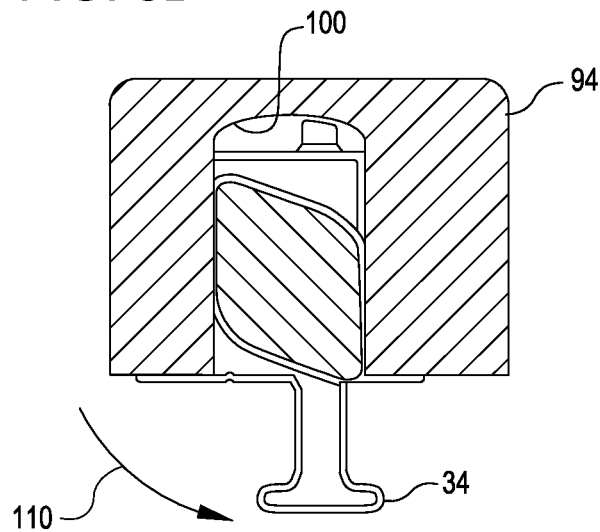
Figure 8E:
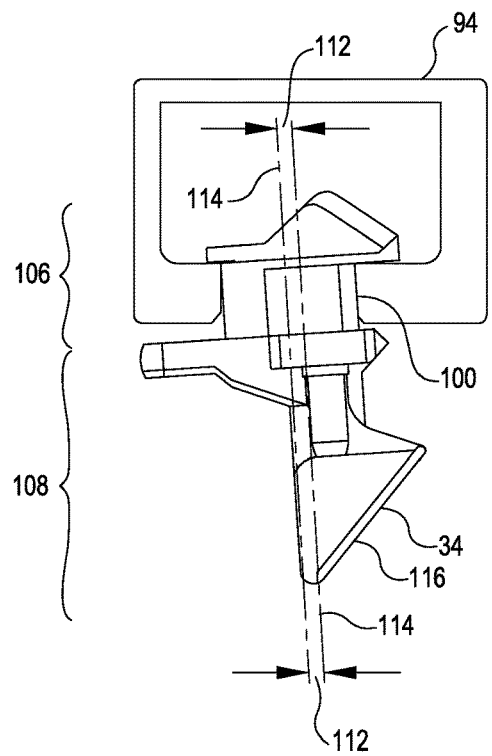
Figure 8F:
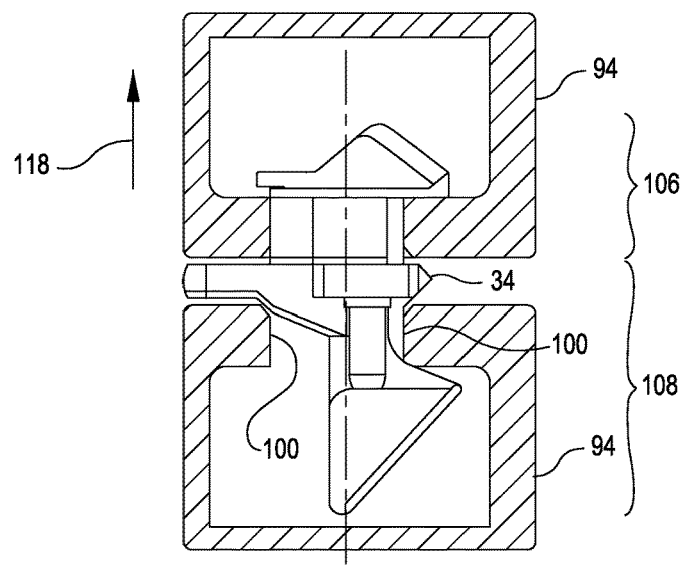

As shown in FIGS. 8A and 8B, for example, the process begins by inserting the first portion 106 of the connector 34 into the receiver 94 of the first crab pot. This includes clocking the first portion 106 such that the first portion 106 may be inserted through the hole 100 of the receiver 94. Then, as shown in FIGS. 8C and 8D, the connector 34 is clocked in the direction of the arrow 110 about sixty degrees to lock the first portion 106 inside the cavity of the receiver 94. Then, as shown in FIG. 8E, the connector 34 is allowed to clock to an angle 112 away from the axis 114. In this and other embodiments, the angle 112 is about 5 degrees. In this position, the connector 34 is ready to be inserted into the receiver 94 of the second pot by moving toward the hole 100 in the second pot's receiver 94. As the connector's second portion 108 first enters the hole 100 an edge of the hole 100 contacts the surface 116 and pushes the connector 34 back into alignment with the axis 114. After the connector 34 is aligned with the axis 114, the second portion 108 continues through the hole 100 until the receiver 94 of the second pot is adjacent the receiver 94 of the first pot 24, as shown in FIG. 8F. To uncouple the two receivers 94, the receiver of the first pot 24, which holds the first portion 106 of the connector 34 is gently moved in the direction indicated by the arrow 118. When two or more connectors 34 couple the first pot 24 to the second pot 24, all of the connectors 34 have to be gently moved simultaneously in the direction indicated by the arrow 118 to uncouple the first pot 24 from the second pot 24. When the combination of the connectors 34 experiences any other type of loading, the connectors 34 hold the two pots 24 together.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A system for stacking and retrieving a crab pot onboard a vessel, the system comprising:
    a crane having an end and operable to position the end at a plurality of locations on or near a vessel's deck to grab a crab pot stored on the deck or to place a crab pot on the deck to secure the pot onboard;
    an end effector at the end of the crane, operable to hold a crab pot;
    a connector operable to couple a first crab pot with a second crab pot, the connector having:
        a first portion operable to hold the first crab pot,
        a second portion operable to hold the second crab pot, and
        each of the first and second portions includes a section configured such that, when each of the portions holds their respective crab pot, each of the portions extends through a hole in a wall of a receiver of their respective crab pot and each of the portions' section extends over the inside surface of the receiver's wall through which its respective portion extends, and wherein the second portion's section extends in a direction that is the same as the direction that a section of the first portion extends, and
        wherein the connector does not include any component that moves relative to another component of the connector; and
    a controller operable to direct the movement of the crane to position the end of the crane at a plurality of locations on or near a vessel's deck.

2. The system of claim 1 wherein the crane includes a base and the base is mounted to the vessel such that the base can move relative to the vessel while the crane positions its end at a location on or near the vessel's deck.

3. The system of claim 1 wherein the end effector is connected to the end of the crane such that the end effector can move relative to the end in at least one of the following directions: rotate about an axis perpendicular to the end, pivot about an axis parallel to the end, extend away from the end, and retract toward the end.

4. The system of claim 1 wherein the end effector is operable to hold the crab pot at four locations on the pot.

5. The system of claim 1 wherein the end effector includes a twist lock operable to secure the crab pot to the end effector.

6. The system of claim 1 wherein the controller includes a program that directs, without human assistance, the movement of the crane to position the end of the crane at a plurality of locations on or near a vessel's deck.

7. The system of claim 1 wherein the controller includes circuitry to allow a human to direct the movement of the crane to position the end of the crane at a plurality of locations on or near a vessel's deck, while the crane moves.

8. A method for stacking and retrieving a crab pot onboard a vessel, the method comprising:
    positioning an end effector of a system's crane adjacent a first crab pot;
    securing the first crab pot to the end effector;
    moving the end effector of the crane toward a location on the vessel;
    directing, with a controller of the system, the movement of the end effector;
    inserting a first portion of a connector into a hole in a wall of a receiver of the first crab pot and positioning the first portion such that a section of the first portion extends over the inside surface of the receiver's wall through which the first portion extends; and
    inserting a second portion of the connector into a hole in a wall of a receiver of the second crab pot and positioning the second portion such that a section of the second portion extends over the inside surface of the receiver's wall through which the second portion extends, wherein the second portion's section extends in a direction that is the same as the direction that a section of the first portion extends, and wherein the connector does not include any component that moves relative to another component of the connector.

9. The method of claim 8 wherein positioning the end effector of the crane includes moving a base of the crane relative to the vessel.

10. The method of claim 8 wherein positioning the end effector includes at least one of the following:
    rotating the end effector about an axis perpendicular to an end of the crane,
    pivoting the end effector about an axis parallel to the end of the crane,
    extending the end effector away from the end of the crane, and
    retracting the end effector toward the end of the crane.

11. The method of claim 8 wherein securing the crab pot to the end effector includes twisting relative to the crab pot a lock inserted into a receiver of the crab pot.

12. The method of claim 8 wherein moving the end effector of the crane toward a location on the vessel includes moving a base of the crane relative to the vessel.

13. The method of claim 8 wherein directing the movement of the end effector includes the controller executing software that directs the movement without human assistance.

14. The method of claim 8 wherein inserting a first portion of the connector into a receiver of the first crab pot includes rotating the connector relative to the receiver.

* * * * *